Jan. 13, 1970  SHOJIRO HASHIZUME  3,489,496
SLIT WIDTH CONTROL DEVICE FOR SPECTROPHOTOMETERS
Filed June 17, 1966

$$s = e^{cx}$$

United States Patent Office 3,489,496
Patented Jan. 13, 1970

3,489,496
SLIT WIDTH CONTROL DEVICE FOR SPECTROPHOTOMETERS
Shojiro Hashizume, Osaka, Japan, assignor to Shimadzu Seisakusho Ltd., Nakagyo-ku, Kyoto, Japan, a corporation of Japan
Filed June 17, 1966, Ser. No. 558,396
Claims priority, application Japan, June 19, 1965 (utility model), 40/49,909
Int. Cl. G01j 3/42, 3/12; G02f 1/30
U.S. Cl. 356—96   7 Claims

ABSTRACT OF THE DISCLOSURE

A slit width control device for spectrophotometers including a pair of slit jaws defining a slit source therebetween, a first cam means defined on the edges of the levers, a first cam follower disposed between said cam surfaces, which surfaces are constructed with a contour for varying the slit width exponentially with displacement of the first cam follower along said cam means, connecting means joining said first cam follower with a second cam follower, adjusting means carried by the connecting means for initially selectively positioning the first cam follower on the cam means for varying the slit width in accordance with a desired resolving power, a wavelength driver for introducing variable wavelength radiant energy into the spectrophotometer and provided with a second cam means engaging and driving said second cam follower and thereby correspondingly displace the first cam follower along the cam means so as to vary the slit width and thereby maintain the relative intensity of radiant energy introduced into said spectrophotometer at a constant level irrespective of variations in the energy wavelength and the selected resolving power of said slit source.

---

Figure 1:
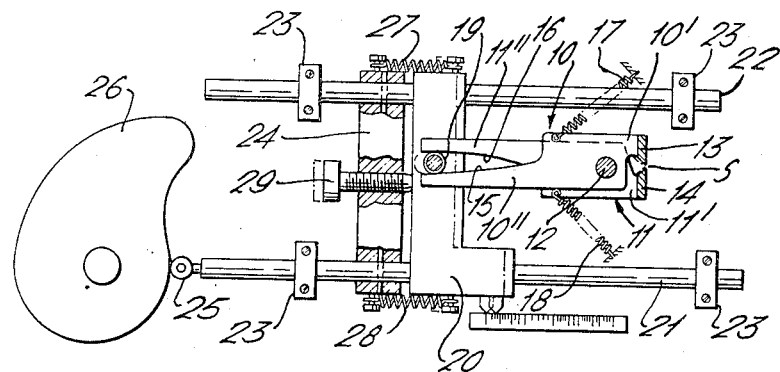

This invention relates to a slit width control device for spectrophotometers.

Spectrophotometers are usually provided with a slit width control mechanism in ganged relationship with a wavelength driving mechanism. Generally, the slit width control mechanism has two functions: The first is to provide a slit program according to which the intensity of the radiation energy introduced into the detector is kept substantially constant, irrespective of variation of wavelength. This is necessary because the intensity of the radiation energy from the source and the transmittance of the dispersing system vary with wavelength. The second function is to vary the resolving power for various measuring purposes.

The intensity I of radiation energy introduced into the detector of a spectrophotometer may be expressed as follows:

$$I = ThS^2JA/f^3G \quad (1)$$

where $J$ = intensity of radiation energy at the source
$S$ = width of the slit
$h$ = height of the slit
$T$ = efficiency of the whole optical system
$A$ = cross-sectional area of the effective radiation beam
$f$ = focal distance of the collimator
$G$ = angular dispersion of the dispersing system It will be seen from the above Equation 1 that the intensity I of the radiation introduced into the detector is proportional to the square of the slit width S if the other variables are determined for a given spectrophotometer.

On the other hand, the slit width may also be given by the following equation:

$$S = Gf\Delta\lambda \quad (2)$$

where G is the angular dispersion of the dispersing system; $f$ is the focal distance of the collimator; and $\Delta\lambda$ is the band width of wavelengths emerging from the exit slit.

Equations 1 and 2 show that the resolving power of the spectrophotometer can be varied by changing the slit width.

When the slit width has been changed for a different resolving power, however, the slit program must also be such that the intensity of the radiation energy introduced into the detector can be maintained at a substantially constant level, irrespective of variation of wavelength in the course of the scanning operation. This has been impossible with prior art slit width control mechanisms.

Accordingly, it is one object of the invention to provide a slit width control device for spectrophotometers which is capable of providing a variable resolving power.

Another object of the invention is to provide such a slit width control device as aforesaid which is capable of maintaining the intensity of radiation energy introduced into the detector at a substantially constant level, irrespective of variation of wavelength, even when the resolving power has been changed.

A further object of the invention is to provide such a slit width control device as aforesaid which is simple in construction, and easy and reliable in operation.

Suppose that a slit program is obtained, according to which the slit width is changed in response to the wavelength driving so as to keep the radiation energy introduced into the detector at a constant level, irrespective of variation of the wavelength. If, according to this program, the relation between the slit width S and wavelength $\lambda$ is expressed as:

$$S = f(\lambda) \quad (3)$$

the slit program for a different resolving power may be expressed as:

$$S' = Kf(\lambda) \quad (4)$$

where K is a constant independent of wavelength. If a mechanism is capable of selecting a desired value of K, a slit program with a variable resolving power can be obtained. This is achieved by the device of the invention.

Figure 2:
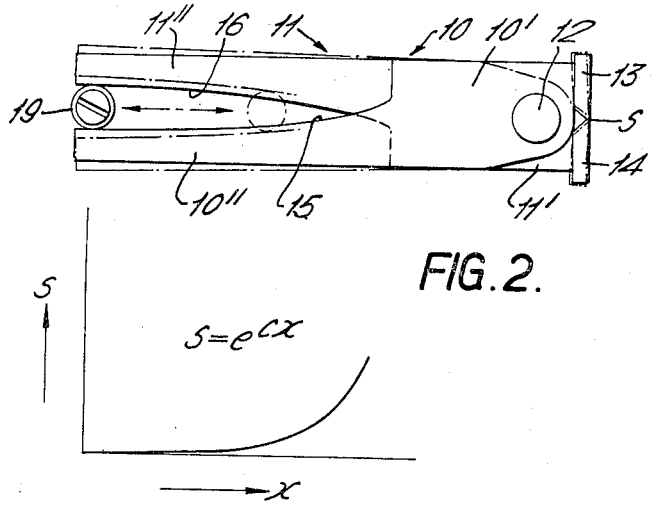

An embodiment of the invention is schematically shown in the accompanying drawings, wherein:

FIG. 1 is a front elevational view, partly in vertical section, of the mechanism embodying the invention; and FIG. 2 is an enlarged elevational view of the cross cam levers with a follower employed in the device of the invention, together with a graph showing the relation between the slit width and the position of the cam follower.

Referring now in detail to the drawings, first to FIG. 1, there are shown a pair of levers 10 and 11 pivoted on a common pin 12 which is rigidly secured to a frame (not shown) of the mechanism. The levers 10 and 11 are arranged crosswise of each other as if to form a pair of scissors, and comprise a pair of arms 10' and 10", and 11' and 11", respectively. A pair of slit jaws 13 and 14 are carried on the outer ends of the lever arms 10' and 11', respectively, while the other lever arms 10" and 11" have their opposed edges formed into cam surfaces 15 and 16, respectively. The cross levers 10 and 11 are biased by a pair of springs 17 and 18, respectively, which tend to decrease a slit width S defined by the pair of slit jaws. Between the cam surfaces 15 and 16 there is disposed a cam follower 19, whose linear movement in a direction generally longitudinal of the levers causes the slit width S to be increased or decreased.

The cam follower 19 is mounted on a block member 20 which is in turn mounted on a pair of parallel guide rods 21 and 22 and is displaceable thereon axially thereof in the manner to be described hereinafter. The guide rods are axially slidably supported by two pairs of bearing members 23 secured to the frame of the mechanism, and are rigidly connected by a bridge members 24 extending generally perpendicularly to the guide rods. The guide rod 21 is provided at one end with a cam follower 25 which is suitably urged against the periphery of a slit program cam 26 mounted for rotation in a predetermined ganged relationship with a wavelength driving mechanism (not shown). The block 20 is connected by a pair of compression springs 27 and 28 to the bridge 24, and an adjusting screw 29 is threaded through the bridge transversely thereof so that its forward end abuts on one side edge of the block 20.

It will be seen that upon rotation of the cam 26 the block 20 and the bridge 24 are moved together, and that by adjusting the screw 29 the block 20 can be displaced relative to the bridge 24, thereby effecting a different resolving power, as explained below.

Referring to FIG. 2, as the cam follower 19 slides on the cam surfaces 15, 16 of the cross levers 10, 11 in the same direction as the axis of the rods 21 and 22, the levers are rotated about the pivot pin 12 so as to vary the slit width S. Let the distance of the movement of the cam follower in that direction be taken along the abscissa, with the width of the slit along the ordinate. The cam surfaces 15 and 16 are formed into such contours that the slit width S may be varied in accordance with the following equation:

$$S = e^{Cx} \quad (5)$$

where C is a constant, and $x$ is the position of the cam follower 19 along the abscissa.

The periphery of the slit program cam 26 can be formed into such a contour that with the cam follower 19 spaced a distance L apart from the cam follower 25, the slit width can be varied so as to keep the intensity I of the radiation energy introduced into the detector at a constant level regardless of variation of the wavelength. Let the relation between the position $x$ of the cam follower 19 along the abscissa and wavelength be expressed as:

$$x = g(\lambda) \quad (6)$$

Substituting the Equation 6 into the Equation 5, $$S = e^{Cg(\lambda)} \quad (7)$$

This provides a slit program with a resolving power, according to which the intensity I is kept constant irrespective of variation of wavelength.

Suppose that by adjusting the screw 29 the cam follower 19 is displaced a distance $\Delta L$ from the previous position, and now positioned a distance $(L + \Delta L)$ from the cam follower 25. By the Equation 5 the slit width S′ will then be given as:

$$S' = e^{C(x + \Delta L)} = e^{C(g(\lambda) + \Delta L)} \quad (8)$$

If the Equation 8 is equal to KS, a different resolving power will be attained and yet the slit program will still assure that the intensity I is kept at a constant level, regardless of variation of wavelength.

Then, dividing the Equation 8 by the Equation 7, $$S'/S = e^{C(g(\lambda) + \Delta L)} / e^{Cg(\lambda)} = e^{C\Delta L}$$

Here, the $\Delta L$ is independent of the wavelength and $$e^{C\Delta L}$$

may be represented by K. Then, $$S' = KS$$

It will be easily seen that the K can be selected of any desired value by changing $\Delta L$, that is, by adjusting the screw 29.

Thus, in accordance with the invention, by simply adjusting the screw 29 it is possible to vary the resolving power and yet maintain the intensity of radiation energy introduced into the detector at a substantially constant level, irrespective of variation of wavelength.

It may be mentioned that strictly speaking, as the slit width is varied in the course of wavelength scanning, the resolving power varies with wavelength. However, a "mean or average" resolving power may be conceived, and this is what is meant here by the term "resolving power" in such expressions as "to vary the resolving power," "a different resolving power," etc. Also, when the resolving power has been changed, the intensity level of the radiation energy is changed or shifted. In accordance with the invention, however, the intensity is yet kept constant, irrespective of wavelength.

A preferred embodiment of the invention having been illustrated and described above, it should be noted that the invention is not limited thereto, and that there are many modifications and changes without departing from the true scope and spirit of the invention. For example, instead of the single slit, a pair of slits may be provided with addition of the necessary parts. Such constructions will be apparent from the foregoing description.

What I claim is:

1. A slit width control device for spectrophotometers comprising: a pair of slit jaws for defining a slit therebetween; a pair of levers arranged crosswise of each other on a common pin for pivotal movement thereabout, said levers carrying said slit jaws on one of their respective ends and having opposed edges formed into cam surfaces; a first cam follower disposed between said cam surfaces; means carrying said first cam follower; said cam surfaces being of such contour that the width of said slit varies exponentially with displacement of said first cam follower along said cam surfaces; a program driving cam; a second cam follower for said program driving cam; means for carrying said second cam follower; means connecting said first and second cam follower carrying means so that displacement of said second cam follower results in a simultaneous, corresponding displacement of said first cam follower; said program driving cam being of such contour that said slit width varies with displacement of said second cam follower along said program driving cam so that the intensity of radiation energy from said slit is kept at a substantially constant level, irrespective of variation of wavelength; and means for selectively varying the position of said first cam follower carrying means relative to said second cam follower carrying means, whereby said energy intensity level is variable.

2. The device as defined in claim 1, wherein said second cam follower carrying means comprises a bridge member and a pair of parallel rods rigidly connected by said bridge member for simultaneous movement; and said first cam follower carrying means comprises a block member mounted on said rods and displaceable relative to said bridge member axially of said rods.

3. The device as defined in claim 2, wherein said means for connecting said first and second cam follower carrying means comprises a pair of springs each having one end secured to said bridge member and its opposite end to said block member.

4. The device as defined in claim 2, wherein said position varying means comprises a screw adjustably threaded through said bridge member so as to have its forward end abutting on one side of said block member.

5. A slit width control device for spectrophotometers comprising: a pair of slit jaws for defining a slit therebetween; a pair of levers arranged crosswise of each other on a common pin for pivotal movement thereabout, said levers carrying said slit jaws on one of their respective ends and having opposed edges formed into cam surfaces; spring means for biasing said levers so as to normally close said slit width; a first cam follower disposed between said cam surfaces; a block member for carrying said cam follower thereon; said cam surfaces being of such contour that the width of said slit varies exponentially with displacement of said first cam follower along said cam surfaces; a program driving cam; a second cam follower riding on said program driving cam; a bridge member, a pair of parallel rods connected by said bridge member so as to be axially movable simultaneously, one of said rods carrying said second cam follower thereon; said block member being mounted on said pair of rods for axial displacement thereon; spring means for connecting said block member and said bridge member so that said two members are movable together upon movement of said rods; said program driving cam being of such contour that said slit width varies with displacement of said second cam follower along said program driving cam so that the intensity of radiation energy from said slit is kept at a substantially constant level, irrespective of variation of wavelength; and an adjustable screw threaded through said bridge member for its forward end to abut on said block member so that said latter member is selectively displaceable on said rods relative to said former member, whereby said energy intensity level is variable.

6. In combination with a spectrophotometer including a slit source, a detector and a wavelength driver for introducing variable wavelength radiation energy into said detector, the improvements comprising:

first cam means comprising a pair of levers arranged crosswise of each other and pinned together for pivotal movement for varying the slit width of said slit source, a first cam follower comprising a slidably mounted pin between and engaged by said pair of levers, the position of said pin between said levers determining the slit width, a second cam follower, connecting means mounting said second cam follower at a selectively adjustable, predetermined distance from said first cam follower, adjusting means movably mounted in position on said connecting means and mounting said pin thereon for varying the initial position of said pin between said pair of levers to selectively vary the initial slit width and thereby select the resolving power thereof, and further to selectively adjust the predetermined distance separating said first and second cam followers, and second cam means attached to said wavelength driver and engaged by said second cam follower for displacing said connecting means and said adjusting means for slidably displacing said pin in position between said levers so as to vary the slit width and thereby maintain the relative intensity of radiation energy introduced into said spectrophotometer at a constant level irrespective of variations in the wavelength energy and the selected resolving power of said slit source.

7. The device as defined in claim 6 and further including a slit defining member secured to an end of each of said levers, said levers having opposed edges formed into cam surfaces of such contours that said slit width varies exponentially with displacement of said first cam follower along said cam surfaces.

References Cited

UNITED STATES PATENTS

| | | | |
|---|---|---|---|
| 2,665,607 | 1/1954 | Blakeslee et al. | 356—1 |
| 2,795,170 | 6/1957 | Hansen et al. | |
| 2,865,247 | 12/1958 | Crandell et al. | 350—271 X |
| 3,416,864 | 12/1968 | Keahl et al. | 356—100 |
| 3,009,390 | 11/1961 | Gale | 350—271 |

RONALD L. WIBERT, Primary Examiner

F. L. EVANS, Assistant Examiner

U.S. Cl. X.R.

350—271; 356—100